US012793292B2

(12) United States Patent
Tan et al.

(10) Patent No.: US 12,793,292 B2
(45) Date of Patent: Nov. 10, 2026

(54) GRAPHICS PRIMITIVE SHARING METHOD, ELECTRONIC DEVICE, CHIP, AND COMPUTER-READABLE STORAGE MEDIUM

(71) Applicant: Huawei Technologies Co., Ltd., Shenzhen (CN)

(72) Inventors: Yang Tan, Xi'an (CN); Shuailei Fang, Xi'an (CN); Chuancai Gu, Shenzhen (CN); Yiyang Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 18/685,734

(22) PCT Filed: Aug. 16, 2022

(86) PCT No.: PCT/CN2022/112769
§ 371 (c)(1),
(2) Date: Feb. 22, 2024

(87) PCT Pub. No.: WO2023/024972
PCT Pub. Date: Mar. 2, 2023

(65) Prior Publication Data

US 2024/0394939 A1 Nov. 28, 2024

(30) Foreign Application Priority Data

Aug. 23, 2021 (CN) ......................... 202110970453.7

(51) Int. Cl.
*G06T 11/23* (2026.01)
*G06F 1/16* (2006.01)
*G06T 5/50* (2006.01)

(52) U.S. Cl.
CPC .............. *G06T 11/23* (2026.01); *G06F 1/163* (2013.01); *G06T 5/50* (2013.01); *G06T 2207/20221* (2013.01)

(58) Field of Classification Search
CPC ..................... G06T 11/203; G06T 5/50; G06T 2207/20221; G06F 1/163
See application file for complete search history.

(56) References Cited

U.S. PATENT DOCUMENTS

2017/0065823 A1* 3/2017 Kaib ...................... A61B 5/333
2024/0169626 A1* 5/2024 Choi ....................... G06F 1/163
2025/0227176 A1* 7/2025 Guo ................. H04W 52/0274

FOREIGN PATENT DOCUMENTS

CN 110166720 A 8/2019

* cited by examiner

*Primary Examiner* — Kee M Tung
*Assistant Examiner* — Khoa Vu
(74) *Attorney, Agent, or Firm* — Slater Matsil, LLP

(57) ABSTRACT

A graphics primitive sharing method is provided and is related to the terminal field. When drawing interface content, a secondary chip in an electronic device obtains a set of controls corresponding to interface content. The secondary chip delegates a control whose drawing effect is poor in the set of controls to a primary chip to perform drawing. The secondary chip composites a graphics primitive drawing result of the secondary chip and a graphics primitive drawing result of the primary chip, and sends a composited result to a display.

17 Claims, 6 Drawing Sheets

GRAPHICS PRIMITIVE SHARING METHOD, ELECTRONIC DEVICE, CHIP, AND COMPUTER-READABLE STORAGE MEDIUM

CROSS-REFERENCE TO RELATED APPLICATIONS

This application is a National Stage of International Application No. PCT/CN2022/112769, filed on Aug. 16, 2022, which claims priority to Chinese Patent Application No. 202110970453.7, filed on Aug. 23, 2021, both of which are hereby incorporated by reference in their entireties.

TECHNICAL FIELD

This application relates to the field of terminal technologies, and in particular, to a graphics primitive sharing method, an electronic device, a chip, and a computer-readable storage medium.

BACKGROUND

Currently, there are terminal devices (such as a smartwatch) equipped with dual chips and dual systems in the market. One operating system that is simpler is carried on a secondary chip with low power consumption and low computing power and the other operating system that is more complex is carried on a primary chip with high power consumption and high computing power. The primary and secondary chips work together to balance device performance and battery life.

Because hardware performance of the secondary chip is poorer, effect of drawing a complex and fine interface is poor. In addition, due to a limited computing power of the secondary chip, an anti-aliasing algorithm cannot be integrated. As a result, jaggies are also generated during drawing of a graph or text. In an existing solution, some complex interfaces are usually drawn on a primary chip side in advance and stored in a terminal device. However, if the terminal device needs to support multiple languages, interfaces of a plurality of versions need to be drawn and stored in advance, which causes excessive usage of memory space of the terminal device.

SUMMARY

In view of this, it is necessary to provide a graphics primitive sharing method, which can solve a disadvantage that a secondary chip cannot perform drawing of a complex and fine interface.

According to a first aspect, an embodiment of this application discloses a graphics primitive sharing method, applied to an electronic device. The electronic device includes a primary chip, a secondary chip, and a display. The primary chip is configured to run a first operating system, and the secondary chip is configured to run a second operating system. The graphics primitive sharing method includes: When the secondary chip performs drawing of interface content, the secondary chip obtains a set of controls corresponding to the interface content, where the set of controls include at least one control; the secondary chip identifies, based on a drawing instruction corresponding to each control in the set of controls, a first-type control that does not meet a preset condition; the secondary chip sends a drawing instruction corresponding to the first-type control to the primary chip to perform drawing; the secondary chip obtains a graphics primitive drawing result of the primary chip; the secondary chip composites a local graphics primitive drawing result and the graphics primitive drawing result of the primary chip, and sends a composited result to the display for display, where the local graphics primitive drawing result is obtained by the secondary chip executing the drawing instruction corresponding to each control to perform drawing.

Based on this technical solution, when the secondary chip performs drawing of the interface content, for a control whose drawing effect is poor, the secondary chip may request the primary chip to assist in drawing, to supplement a disadvantage that the secondary chip cannot perform drawing of a complex and fine interface due to a low hardware capability.

In a possible implementation, the graphics primitive sharing method further includes: The secondary chip invokes a UI drawing framework to obtain the drawing instruction corresponding to each control in the set of controls.

Based on this technical solution, the secondary chip may invoke the UI drawing framework, for example, a UIkit framework, to obtain the drawing instruction corresponding to each control, to identify the first-type control that does not meet the preset condition.

In a possible implementation, that the secondary chip sends a drawing instruction corresponding to the first-type control to the primary chip to perform drawing includes: The secondary chip marks a control that does not meet the preset condition, to obtain the first-type control; and the secondary chip sends a drawing instruction corresponding to the first-type control to the primary chip to perform drawing.

Based on the technical solution, the secondary chip may mark the control that does not meet the preset condition, and further, may delegate the marked control to the primary chip to perform drawing.

In a possible implementation, the electronic device further includes a memory, where the memory is configured to store a graphics primitive drawing result of the primary chip, and that the secondary chip obtains a graphics primitive drawing result of the primary chip includes: The secondary chip reads the graphics primitive drawing result of the primary chip from the memory.

Based on this technical solution, the memory is disposed to store the graphics primitive drawing result of the primary chip, so that the secondary chip can read the graphics primitive drawing result of the primary chip from the memory, and the primary chip can enter a sleep state after completing delegated control drawing.

In a possible implementation, that the secondary chip identifies, based on a drawing instruction corresponding to each control in the set of controls, a first-type control that does not meet a preset condition includes: When a drawing instruction corresponding to a control includes a preset instruction, the secondary chip determines that the control is the first-type control.

Based on this technical solution, the preset instruction is pre-defined based on graphics primitive drawing performance of the secondary chip. If a drawing instruction of a specific control includes the preset instruction, the control may be determined as a control whose drawing effect is poor on a secondary chip side.

In a possible implementation, that the secondary chip composites a local graphics primitive drawing result and the graphics primitive drawing result of the primary chip includes: The secondary chip composites the graphics primitive drawing result of the primary chip and the local graphics primitive drawing result in a superimposed manner; or the secondary chip replaces a part that is in the local graphics primitive drawing result and that is corresponding to the first-type control with the graphics primitive drawing result of the primary chip.

Based on this technical solution, a local graphics primitive drawn by the secondary chip and a graphics primitive delegated to the primary chip to perform drawing can be composited, so that interface content displayed on the display has no disadvantage such as jaggies, to supplement a disadvantage that the secondary chip cannot perform drawing of a complex and fine interface due to a low hardware capability.

According to a second aspect, an embodiment of this application provides a graphics primitive sharing method, applied to an electronic device. The electronic device includes a primary chip, a secondary chip, a memory, and a display. The primary chip is configured to run a first operating system, and the secondary chip is configured to run a second operating system. The graphics primitive sharing method includes: When a secondary chip performs drawing of interface content, the secondary chip obtains a set of controls corresponding to the interface content, where the set of controls include at least one control; the secondary chip identifies, based on a drawing instruction corresponding to each control in the set of controls, a first-type control that does not meet a preset condition; and the secondary chip reads a graphics primitive drawing result corresponding to the first-type control from the memory; and the secondary chip composites a local graphics primitive drawing result and the graphics primitive drawing result read from the memory, and sends a composited result to the display for display, where the local graphics primitive drawing result is obtained by the secondary chip executing the drawing instruction corresponding to each control to perform drawing.

Based on this technical solution, when the secondary chip performs drawing of the interface content, for a control whose drawing effect is poor, the secondary chip may attempt to read, from the memory, a graphics primitive corresponding to the control whose drawing effect is poor, to supplement a disadvantage that the secondary chip cannot perform drawing of a complex and fine interface due to a low hardware capability.

In a possible implementation, the second operating system includes at least one preset application, and the graphics primitive sharing method further includes: The primary chip obtains a set of controls needed by the secondary chip for drawing of interface content of the preset application; the primary chip identifies a control that is in the set and that does not meet the preset condition; the primary chip executes a drawing instruction corresponding to the control that is in the set and that does not meet the preset condition, and obtain a plurality of shared graphics primitives through drawing; and the primary chip stores the plurality of shared graphics primitives in the memory.

Based on this technical solution, the primary chip pre-identifies the control whose drawing effect is poor on the secondary chip side, and pre-renders the controls whose drawing effect is poor into shared graphics primitives and stores the shared graphics primitives in the memory, so that when subsequently drawing interface content, the secondary chip may attempt to read, from the memory, graphics primitives corresponding to the controls whose drawing effect is poor.

In a possible implementation, the graphics primitive sharing method further includes: When the secondary chip fails to read, from the memory, the graphics primitive drawing result corresponding to the first-type control, the secondary chip sends a drawing instruction corresponding to a control that is in the first-type control and that does not have a graphics primitive drawing result to the primary chip to perform drawing; and the primary chip executes the drawing instruction sent by the secondary chip, and stores a graphics primitive drawing result corresponding to the drawing instruction in the memory.

Based on this technical solution, when the secondary chip performs drawing of the interface content, for the control with the poor drawing effect, if a shared graphics primitive needed by the secondary chip is not included in the memory, the secondary chip may request the primary chip to assist in drawing, to supplement a disadvantage that the secondary chip cannot perform drawing of a complex and fine interface due to a low hardware capability.

In a possible implementation, that the secondary chip identifies, based on a drawing instruction corresponding to each control in the set of controls, a first-type control that does not meet a preset condition includes: When a drawing instruction corresponding to a control includes a preset instruction, the secondary chip determines that the control is the first-type control.

Based on this technical solution, the preset instruction is pre-defined based on graphics primitive drawing performance of the secondary chip. If a drawing instruction of a specific control includes the preset instruction, the control may be determined as a control (the first-type control) whose drawing effect is poor on the secondary chip side.

In a possible implementation, that the secondary chip composites a local graphics primitive drawing result and the graphics primitive drawing result read from the memory includes: The secondary chip composites the graphics primitive drawing result read from the memory and the local graphics primitive drawing result in a superimposed manner; or the secondary chip replaces a part that is in the local graphics primitive drawing result and that is corresponding to the first-type control with the graphics primitive drawing result read from the memory.

Based on this technical solution, a local graphics primitive drawn by the secondary chip and a graphics primitive read from the memory can be composited, so that interface content displayed on the display has no disadvantage such as jaggies, to supplement a disadvantage that the secondary chip cannot perform drawing of a complex and fine interface due to a low hardware capability.

According to a third aspect, an embodiment of this application provides an electronic device, and the electronic device includes a primary chip, a secondary chip, a memory, and a display. The primary chip runs a first operating system, the secondary chip runs a second operating system, the first operating system includes a first graphics primitive sharing service program and a graphics primitive drawing program, and the second operating system includes a second graphics primitive sharing service program and a first application. When the first application performs drawing of interface content, the first application obtains a shared graphics primitive included in the interface content, where the shared graphics primitive is a graphics primitive whose drawing effect on a secondary chip side does not meet a preset requirement; the first application sends a drawing request of the shared graphics primitive to the graphics primitive drawing program by using the second graphics primitive sharing service program and the first graphics primitive sharing service program; the graphics primitive drawing program performs graphics primitive drawing in response to the drawing request of the shared graphics primitive; and the primary chip stores a graphics primitive drawing result of the graphics primitive drawing program in the memory; the secondary chip composites a local graphics primitive drawing result and a graphics primitive drawing result read from the memory, and sends a composited result to the display for display, where the local graphics primitive drawing result is obtained through drawing of the first application.

Based on this technical solution, when the secondary chip performs drawing of the interface content, for a control whose drawing effect is poor, the secondary chip may request the primary chip to assist in drawing, to supplement a disadvantage that the secondary chip cannot perform drawing of a complex and fine interface due to a low hardware capability.

In a possible implementation, the memory is a first graphics memory, the secondary chip includes a second graphics memory, and the second graphics memory is configured to store the local graphics primitive drawing result.

In a possible implementation, the secondary chip composites the local graphics primitive drawing result and the graphics primitive drawing result read from the memory in a superimposed manner, or the secondary chip replaces a part that is in the local graphics primitive drawing result and that is corresponding to the shared graphics primitive with the graphics primitive drawing result read from the memory.

Based on this technical solution, a local graphics primitive drawn by the secondary chip and a graphics primitive read from the memory can be composited, so that interface content displayed on the display has no disadvantage such as jaggies, to supplement a disadvantage that the secondary chip cannot perform drawing of a complex and fine interface due to a low hardware capability.

According to a fourth aspect, an embodiment of this application provides a computer-readable storage medium, and the computer-readable storage medium includes computer instructions. When the computer instructions are run on an electronic device, the electronic device is enabled to perform the graphics primitive sharing method according to the first aspect or the second aspect.

According to a fifth aspect, an embodiment of this application provides a computer program product. When the computer program product is run on a computer, the computer is enabled to perform the graphics primitive sharing method according to the first aspect or the second aspect.

According to a sixth aspect, an embodiment of this application provides an apparatus (for example, a chip). The apparatus includes a function of implementing behavior of a secondary chip in the method provided in the first aspect or the second aspect. The function may be implemented by hardware, or may be implemented by executing corresponding software by hardware. The hardware or the software includes one or more modules corresponding to the function.

It may be understood that the computer-readable storage medium according to the fourth aspect, the computer program product according to the fifth aspect, and the apparatus according to the fifth aspect all correspond to the method according to the first aspect or the second aspect. Therefore, for beneficial effects that can be achieved by the computer-readable storage medium according to the fourth aspect, the computer program product according to the fifth aspect, and the apparatus according to the fifth aspect, refer to beneficial effects in the corresponding method provided above. Details are not described herein again.

DETAILED DESCRIPTION OF ILLUSTRATIVE EMBODIMENTS

It should be noted that in this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and so on (if existent) are intended to distinguish between similar objects but do not necessarily indicate a specific order or sequence.

In addition, in embodiments of this application, the word "exemplary", "for example", or the like represents giving an example, an illustration, or a description. Any embodiment or design described by "example" or "for example" in embodiments of this application should not be construed as being more preferred or advantageous than another embodiment or design. Exactly, use of the word "example", "for example", or the like is intended to present a related concept in a specific manner.

For ease of understanding, some concepts related to embodiments of this application are described for reference by using examples.

An application (application, APP) may be referred to as an application for short, and is a software program that can implement one or more specific functions. Generally, a plurality of applications may be installed in an electronic device, for example, an instant messaging application, a video application, an audio application, an image shooting application, and a cloud desktop application. The instant messaging application may include, for example, a messaging application, WeChat (WeChat), WhatsApp Messenger, LINE (Line), photo sharing (instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, KuGou, XiaMi Music, and QQ Music. An application mentioned in the following embodiments may be an application installed when the electronic device is delivered from the factory, or may be a third-party application downloaded by a user from a network or obtained by the user from another electronic device during use of the electronic device.

Figure 1:
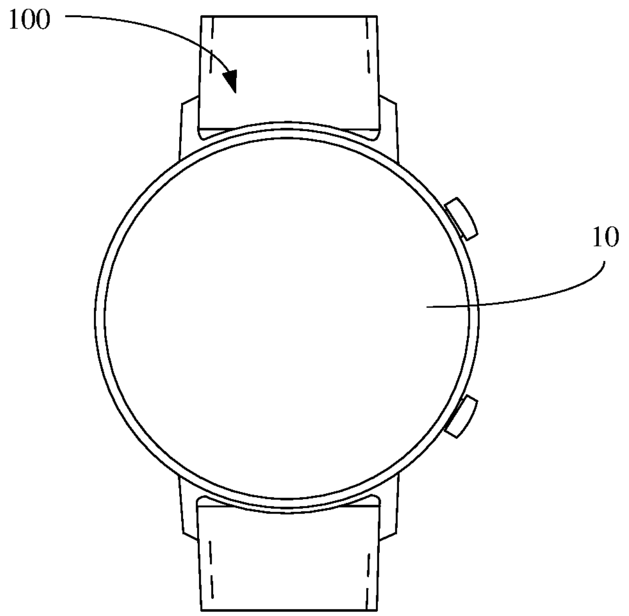
FIG. 1 is a schematic diagram of an application scenario of a graphics primitive sharing method according to an embodiment of this application.

With reference to FIG. 1, an example is used below to describe a schematic diagram of an application scenario of a graphics primitive sharing method according to an embodiment of the present invention.

This embodiment may be applied to the electronic device 100. The electronic device 100 may be a device having a display. For example, the electronic device 100 may be a device such as a smartwatch, a mobile phone, a tablet computer, or a smart home. The electronic device 100 may communicate with another electronic device or server by using a communication network. The communication network may be a local area network, may be a wide area network relayed by using a relay (relay) device, or may include both a local area network and a wide area network. For example, when the communication network is a local area network, the communication network may be a short-range communication network such as a Wi-Fi hotspot network, a Wi-Fi P2P network, a Bluetooth network, a ZigBee network, or a near field communication (near field communication, NFC) network. When the communication network is the wide area network, for example, the communication network may be a third-generation wireless telephone technology ($3^{rd}$-generation wireless telephone technology, 3G) network, a fourth generation mobile communication technology (the $4^{th}$ generation mobile communication technology, 4G) network, a fifth generation mobile communication technology ($5^{th}$-generation mobile communication technology, 5G) network, a future evolved public land mobile network (public land mobile network, PLMN), or an internet.

The electronic device 100 may be equipped with two operating systems, and the operating systems may be iOS®, Android®, Microsoft®, a HarmonyOS, or the like. In FIG. 1, an example in which the electronic device 100 is a smartwatch is used for description, and the electronic device 100 includes a display 10. The display 10 is configured to display a display interface of an application. The display 10 may be a liquid crystal display (liquid crystal display, LCD), an organic light-emitting diode (organic light-emitting diode, OLED) display, an active-matrix organic light-emitting diode or active-matrix organic light-emitting diode (active-matrix organic light-emitting diode, AMOLED) display, a flexible light-emitting diode (flexible light-emitting diode, FLED) display, a quantum dot light-emitting diode (quantum dot light-emitting diodes, QLED) display, or the like.

Figure 2:
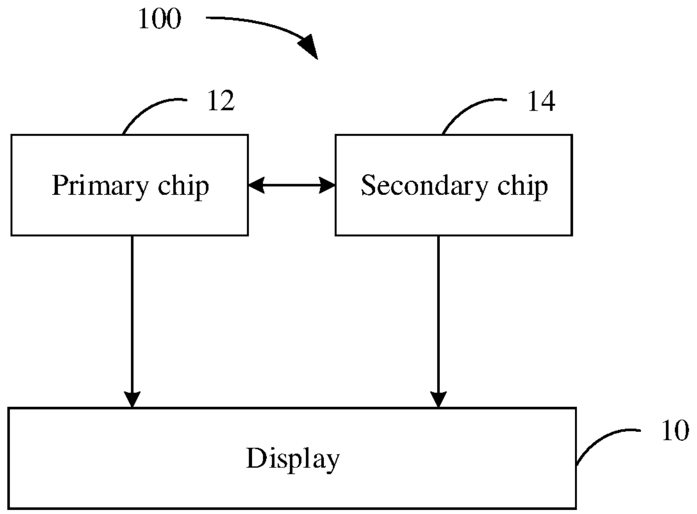
FIG. 2 is a schematic diagram of a hardware module for implementing graphics primitive sharing in an electronic device according to an embodiment of this application.

As shown in FIG. 2, the electronic device 100 includes a display 10, a primary chip 12, and a secondary chip 14. The primary chip 12 is configured to run a first operating system, and the secondary chip 14 is configured to run a second operating system. Performance of the secondary chip 14 is lower than performance of the primary chip 12, and power consumption of the secondary chip 14 is lower than power consumption of the primary chip 12. Through collaboration of the primary chip 12 and the secondary chip 14, both high performance and a long battery life can be balanced for the electronic device 100.

In some embodiments, because performance of the secondary chip 14 is lower than performance of the primary chip 12, the second operating system run by the secondary chip 14 may be a lightweight version of the first operating system. A lightweight operating system does not require a very high hardware configuration, and may run on a low-power chip. However, compared with the first operating system, the lightweight operating system has a lower system processing capability and provides fewer system functions.

In some embodiments, the primary chip 12 may be a processing chip with high power consumption and high chip computing power, such as a central processing unit (central processing unit, CPU), a system on chip (System on Chip, SoC), or an application processor (application processor, AP). The secondary chip 14 may be a processing chip with low power consumption and low chip computing power, such as a microcontroller unit (Microcontroller Unit, MCU) or a single chip microcomputer (Single Chip Microcomputer, SCM).

For example, the electronic device 100 is a smartwatch, and the electronic device 100 includes a first operation mode and a second operation mode. In the first operation mode, all functions of the smartwatch are enabled. In this case, power consumption of the smartwatch is higher, the primary chip 12 may perform drawing of interface content, and a drawing result may be sent to the display 10 for display. In the second operation mode, the smartwatch may enable only some common functions (such as heart rate monitoring, notification viewing, and simple watch face display). In this case, power consumption of the smartwatch is lower. In the second working mode, the primary chip 12 is in a sleep state, and the second operating system run by the secondary chip 14 implements the common functions. In the second working mode, because chip computing power of the secondary chip 14 is limited, when the secondary chip 14 performs drawing of the interface content, there may be some controls whose drawing effect is poor. The secondary chip 14 may delegate the controls whose drawing effect is poor to the primary chip 12 to perform drawing. Then, the secondary chip 14 composites a drawing result of the secondary chip 14 and a drawing result of the primary chip 12, and sends a composited result to the display 10 for display, so that a distortion is avoided, such as jaggies that occurs in drawing due to poor hardware performance of the secondary chip 14. The primary chip 12 may continue to enter the sleep state after completing delegated drawing of the control.

Figure 3:
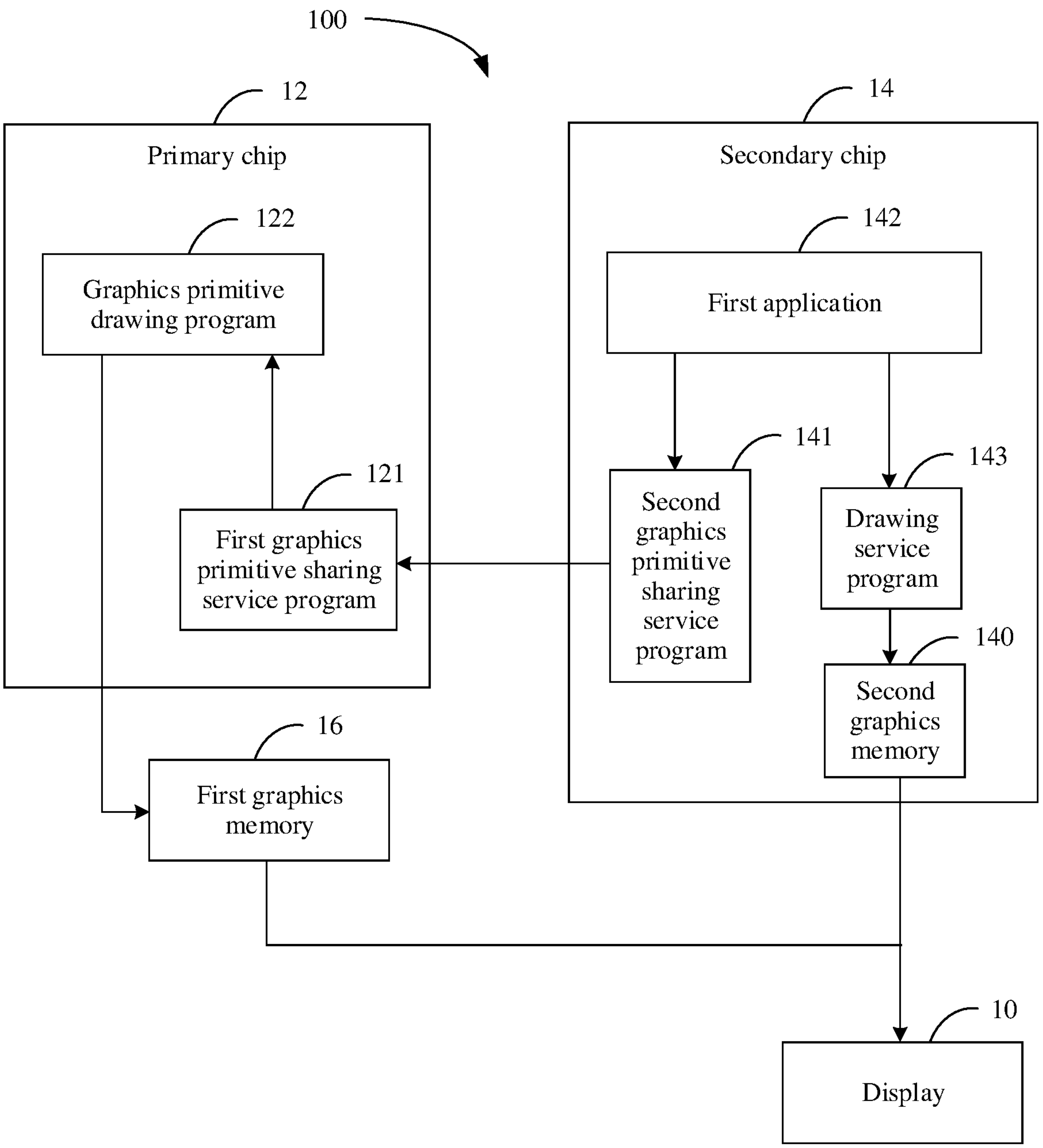
FIG. 3 is a schematic diagram of a software architecture for implementing graphics primitive sharing in an electronic device according to an embodiment of this application.

FIG. 3 is a schematic diagram of an architecture for implementing graphics primitive sharing in an electronic device according to an embodiment of this application.

The electronic device 100 includes a display 10, a primary chip 12, a secondary chip 14, and a first graphics memory 16. The primary chip 12 is configured to run a first operating system, and the secondary chip 14 is configured to run a second operating system. Both the primary chip 12 and the secondary chip 14 have read/write permission of the first graphics memory 16. The first graphics memory 16 is configured to store a graphics primitive shared to the secondary chip 14. For example, when the primary chip 12 receives a graphics primitive drawing request of the secondary chip 14, the primary chip 12 may perform graphics primitive drawing in response to the graphics primitive drawing request, and store a graphics primitive obtained through drawing in the first graphics memory 16. The secondary chip 14 may read, from the first graphics memory 16, a graphics primitive that is delegated by the secondary chip 14 to the primary chip 12 to perform drawing. The secondary chip 14 may further include a second graphics memory 140, and the second graphics memory 140 is configured to store a graphics primitive drawn by the secondary chip 14. Both the first graphics memory 16 and the second graphics memory 140 may be any one of a static random access memory (Static Random Access Memory, SRAM), a synchronous dynamic random access memory (Synchronous Dynamic Random Access Memory, SDRAM), a double data rate SDRAM (Double Data Rate SDRAM, DDR), or the like. In some embodiments, the first graphics memory 16 and the second graphics memory 140 may alternatively be memories of another type. This is not limited herein.

The first operating system may include a first graphics primitive sharing service program 121 and a graphics primitive drawing program 122, and the second operating system may include a second graphics primitive sharing service program 141, a first application 142, and a drawing service program 143. The first application 142 may be an application installed when the electronic device 100 is delivered from a factory, or may be a third-party application downloaded from a network or obtained by a user from another electronic device in a process of using the electronic device 100. An example is used below in which the first application 142 is a watch face application for description.

When the first application 142 is displayed at the front end, the first application 142 performs drawing of a watch face interface, and the first application 142 may obtain a shared graphics primitive included in the watch face interface. The shared graphics primitive may refer to a graphics primitive whose drawing effect of drawing the graphics primitive on a secondary chip side does not meet a preset requirement. A preset condition may be defined based on an actual requirement. For example, the preset condition may mean that jaggies exist in a graphics primitive obtained by drawing on the secondary chip side, definition does not meet a requirement, or the like.

In some embodiments, the first application 142 may invoke a drawing service program 143 to perform drawing of the watch face interface, and the drawing service program 143 may include a UI drawing framework, for example, a UIkit framework. The watch face interface may be divided into a plurality of graphics primitives, and each graphics primitive may correspond to one control. The drawing service program 143 may store the plurality of graphics primitives obtained through drawing in the second graphics memory 140.

In some embodiments, the UI drawing framework may identify a drawing instruction corresponding to a control. When a drawing instruction corresponding to a control includes a preset instruction, a graphics primitive corresponding to the control may be determined as a shared graphics primitive, drawing effect of drawing the graphics primitive corresponding to the control on the secondary chip side may be determined as poor, and the drawing needs the primary chip 12 for assistance. The preset instruction may be pre-defined based on graphics primitive drawing performance of the secondary chip 14. For example, when the secondary chip 14 draws an arc text, jaggies are generated, and the preset instruction may be set to a drawing instruction including the arc text.

After a drawing instruction corresponding to each control in the watch face interface is analyzed, the first application 142 may obtain a shared graphics primitive included in the watch face interface, the first application 142 sends a drawing request of the shared graphics primitive to the second graphics primitive sharing service program 141, and the second graphics primitive sharing service program 141 forwards the drawing request of the shared graphics primitive to the first graphics primitive sharing service program 121, so that the primary chip 12 receives the drawing request of the shared graphics primitive sent by the secondary chip 14.

The first graphics primitive sharing service program 121 may send the drawing request of the shared graphics primitive to the graphics primitive drawing program 122, and the graphics primitive drawing program 122 performs drawing of the shared graphics primitive in response to the received drawing request of the shared graphics primitive. Because performance of the primary chip 12 is higher, jaggies do not exist in a shared graphics primitive obtained through drawing of the graphics primitive drawing program 122. The primary chip 12 may store the shared graphics primitive obtained through drawing of the graphics primitive drawing program 122 in the first graphics memory 16. The secondary chip 14 may read, from the first graphics memory 16, the shared graphics primitive obtained through drawing of the primary chip 12.

In some embodiments, the drawing request of the shared graphics primitive may include a drawing instruction corresponding to the shared graphics primitive, so that the graphics primitive drawing program 122 may execute the drawing instruction corresponding to the shared graphics primitive to perform drawing of the shared graphics primitive.

The secondary chip 14 may composite a plurality of graphics primitives stored in the second graphics memory 140 and the shared graphics primitives read from the first graphics memory 16, and send a composited result to the display 10 for decoding and displaying. For example, the secondary chip 14 may composite, in the second graphics memory 140, a local graphics primitive (a graphics primitive obtained through drawing of the drawing service program 143) and the shared graphics primitive.

In some embodiments, when the primary chip 12 stores, in the first graphics memory 16, the shared graphics primitive drawn by the graphics primitive drawing program 122, the primary chip 12 may send a drawing complete message to the secondary chip 14, to prompt the secondary chip 14 that drawing of the shared graphics primitive is completed.

In some embodiments, a plurality of graphics primitives obtained through drawing of the drawing service program 143 may form a complete watch face interface, but jaggies exist in some graphics primitives obtained through drawing of the drawing service program 143. The secondary chip 14 may composite the plurality of graphics primitives stored in the second graphics memory 140 and the shared graphics primitive read from the first graphics memory 16 in a superimposed manner, so that jaggies do not exist in a watch face interface finally obtained through compositing.

In some embodiments, the secondary chip 14 may alternatively replace a graphics primitive in which jaggies exist in the plurality of graphics primitives stored in the second graphics memory 140 with the shared graphics primitive read from the first graphics memory 16, so that jaggies do not exist in a watch face interface finally obtained through compositing.

In some embodiments, for a preset application installed in the second operating system, the primary chip 12 may pre-identify a control whose drawing effect is poor on the secondary chip side and that is in an interface of the preset application. The controls whose drawing effect is poor may be marked by the primary chip 12. The primary chip 12 may pre-render the marked controls into shared graphics primitives and store the shared graphics primitives in the first graphics memory 16. When performing interface content drawing, the secondary chip 14 may attempt to replace a graphics primitive whose drawing effect is poor with the shared graphics primitive stored in the first graphics memory 16. If a shared graphics primitive needed by the secondary chip 14 is not included in the first graphics memory 16, the secondary chip 14 may further delegate the primary chip 12 to perform graphics primitive drawing.

Figure 4:
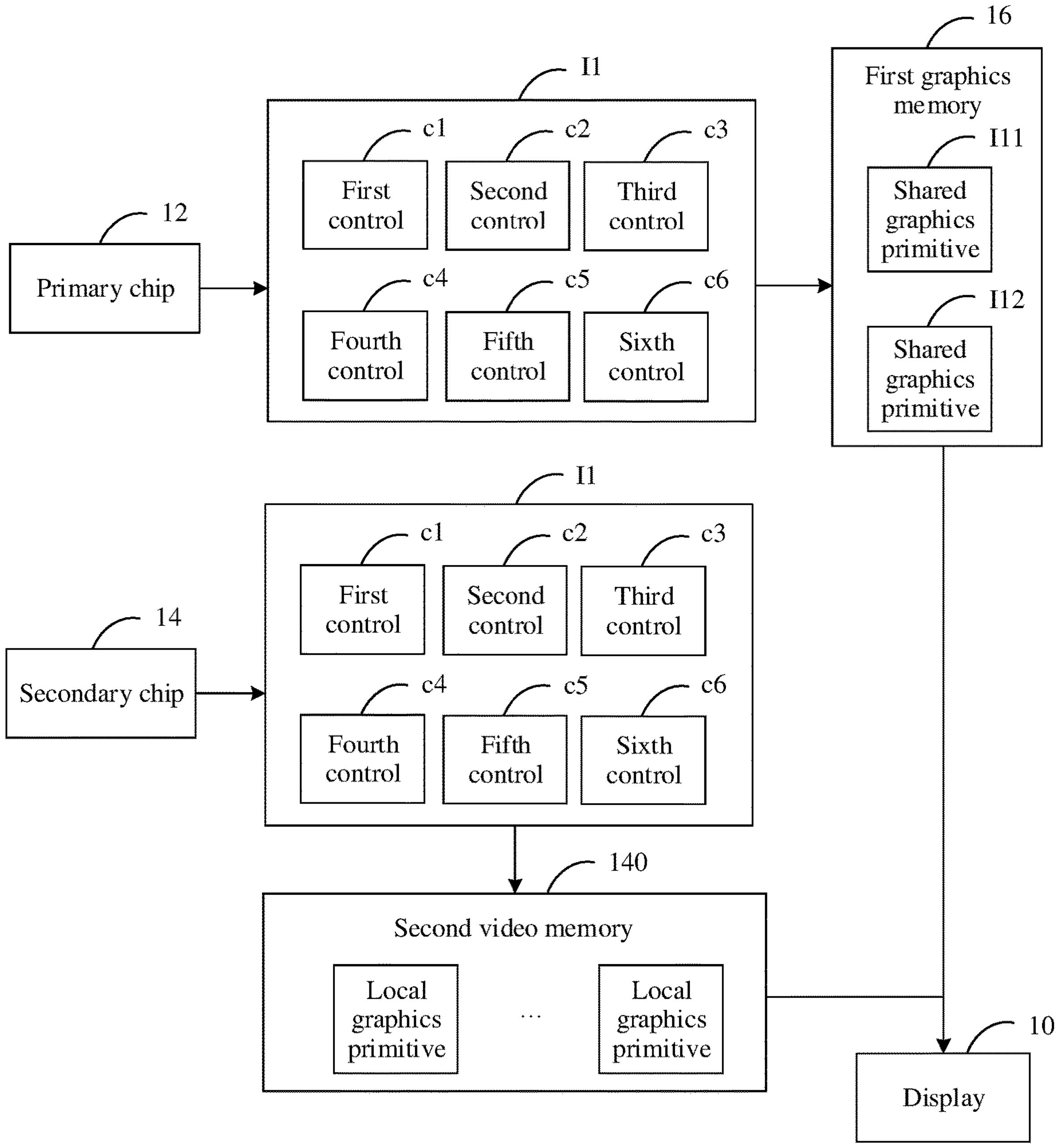
FIG. 4 is a schematic diagram of drawing a watch face interface in an electronic device according to an embodiment of this application.

As shown in FIG. 4, a watch face interface I1 is used as an example. The watch face interface I1 is an interface of a preset watch face application in the second operating system. The watch face interface I1 may be divided into a plurality of graphics primitives, and each graphics primitive may correspond to one control. The primary chip 16 may obtain a set of controls needed for drawing the watch face interface I1. For example, drawing of the watch face interface I1 is related to a first control c1, a second control c2, a third control c3, a fourth control c4, a fifth control c5, and a sixth control c6. The primary chip 12 may identify whether a control whose drawing effect is poor on the secondary chip 14 side exists in the first control to the sixth control c1 to c6. Assuming that the first control c1 and the sixth control c6 are controls whose drawing effect is poor on the secondary chip 14 side, the primary chip 12 may pre-execute drawing instructions corresponding to the first control c1 and the sixth control c6 to obtain shared graphics primitives I11 and I12. The primary chip 16 may store the shared graphics primitives I11 and I12 obtained through drawing to the first graphics memory 16.

When the secondary chip 14 performs drawing of the watch face interface I1, the secondary chip 14 may obtain a set of controls needed for drawing the watch face interface I1. The secondary chip 14 may identify a control whose drawing effect is poor and that is included in the set of controls. The secondary chip 14 may execute drawing instructions corresponding to the first control to the sixth control c1 to c6 to obtain a plurality of local graphics primitives, and the plurality of local graphics primitives may be stored in the second graphics memory 140. The secondary chip 14 may attempt to read, from the first graphics memory 16, a shared graphics primitive corresponding to the control whose drawing effect is poor, composite the local graphics primitive and the shared graphics primitive in a superimposed manner, and then send a composited result to the display 10 for display.

In some embodiments, if the first graphics memory 16 does not include a shared graphics primitive corresponding to the control whose drawing effect is poor, the secondary chip 14 may request the primary chip 12 to perform drawing of the shared graphics primitive.

Figure 5:
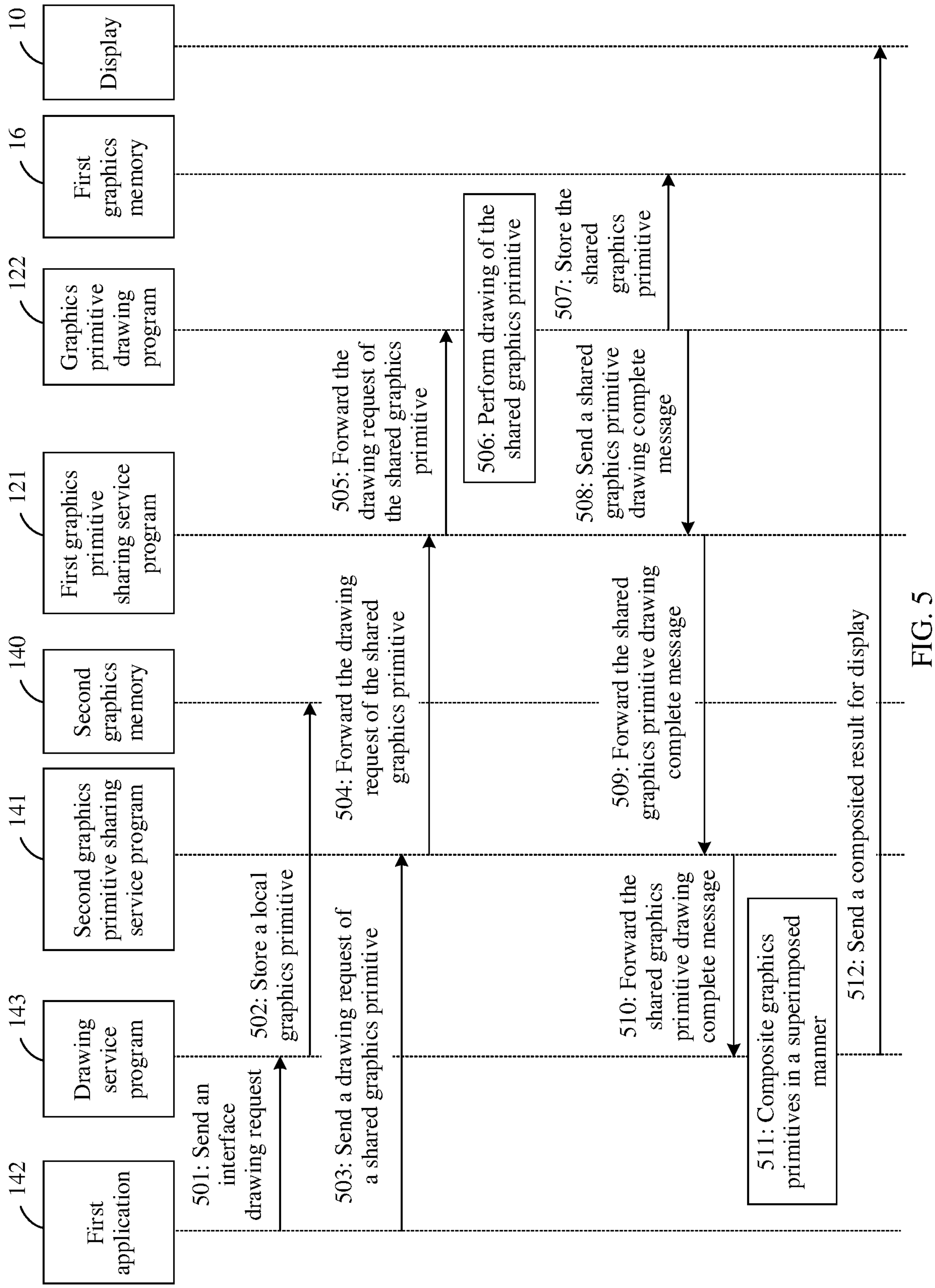
FIG. 5 is a schematic diagram of internal data interaction for implementing graphics primitive sharing in an electronic device according to an embodiment of this application.

FIG. 5 is a schematic diagram of data interaction between function modules of an electronic device according to an embodiment of this application.

For ease of description below, in the following application scenario, the electronic device 100 includes a display 10, a primary chip 12, a secondary chip 14, and a first graphics memory 16. The primary chip 12 is configured to run a first operating system, and the secondary chip 14 is configured to run a second operating system. The secondary chip 14 includes a second graphics memory 140. The first operating system includes a first graphics primitive sharing service program 121 and a graphics primitive drawing program 122, and the second operating system includes a second graphics primitive sharing service program 141, a first application 142, and a drawing service program 143.

501: When the first application 142 performs drawing of interface content, the first application 142 sends an interface drawing request to the drawing service program 143.

502: The drawing service program 143 performs drawing of the interface content, and stores a local graphics primitive obtained through drawing to the second graphics memory 140.

In some embodiments, the drawing service program 143 may include a UI drawing framework, such as a UIkit framework. The drawing service program 143 may obtain a set of controls needed for drawing the interface content. The drawing service program 143 then executes a drawing instruction corresponding to each control in the set of controls, and obtain a plurality of graphics primitives (local graphics primitives) through drawing. The plurality of local graphics primitives are stored in the second graphics memory 140.

503: The first application 142 obtains a shared graphics primitive included in the interface content, and sends a drawing request of the shared graphics primitive to the second graphics primitive sharing service program 141.

In some embodiments, the UI drawing framework may identify a drawing instruction corresponding to a control. When a drawing instruction corresponding to a specific control includes a preset instruction, it may be determined that a graphics primitive corresponding to the control is a shared graphics primitive. After the drawing instruction corresponding to each control in the set of controls is analyzed, the first application 142 may obtain the shared graphics primitive included in the interface content.

In some embodiments, the shared graphics primitive may be determined as a graphics primitive that has poor drawing effect of drawing the graphics primitive corresponding to the control on the secondary chip side and that needs to be drawn with assistance of the primary chip 12. The preset instruction may be pre-defined based on graphics primitive drawing performance of the secondary chip 14. For example, when the secondary chip 14 draws an arc text, jaggies are generated, and the preset instruction may be set to a drawing instruction including the arc text.

504: The second graphics primitive sharing service program 141 sends the drawing request of the shared graphics primitive to the first graphics primitive sharing service program 121.

505: The first graphics primitive sharing service program 121 sends the drawing request of the shared graphics primitive to the graphics primitive drawing program 122.

506: The graphics primitive drawing program 122 performs drawing of the shared graphics primitive in response to the drawing request of the shared graphics primitive.

507: The graphics primitive drawing program 122 stores the shared graphics primitive obtained through drawing in the first graphics memory 16.

508: The graphics primitive drawing program 122 sends a shared graphics primitive drawing complete message to the first graphics primitive sharing service program 121.

509: The first graphics primitive sharing service program 121 sends the shared graphics primitive drawing complete message to the second graphics primitive sharing service program 141.

510: The second graphics primitive sharing service program 141 sends the shared graphics primitive drawing complete message to the drawing service program 143.

511: The drawing service program 143 composites the local graphics primitive stored in the second graphics memory 140 and the shared graphics primitive stored in the first graphics memory 16 in a superimposed manner.

512: The drawing service program 143 sends a composited result to the display 10 for decoding and displaying.

Figure 6:
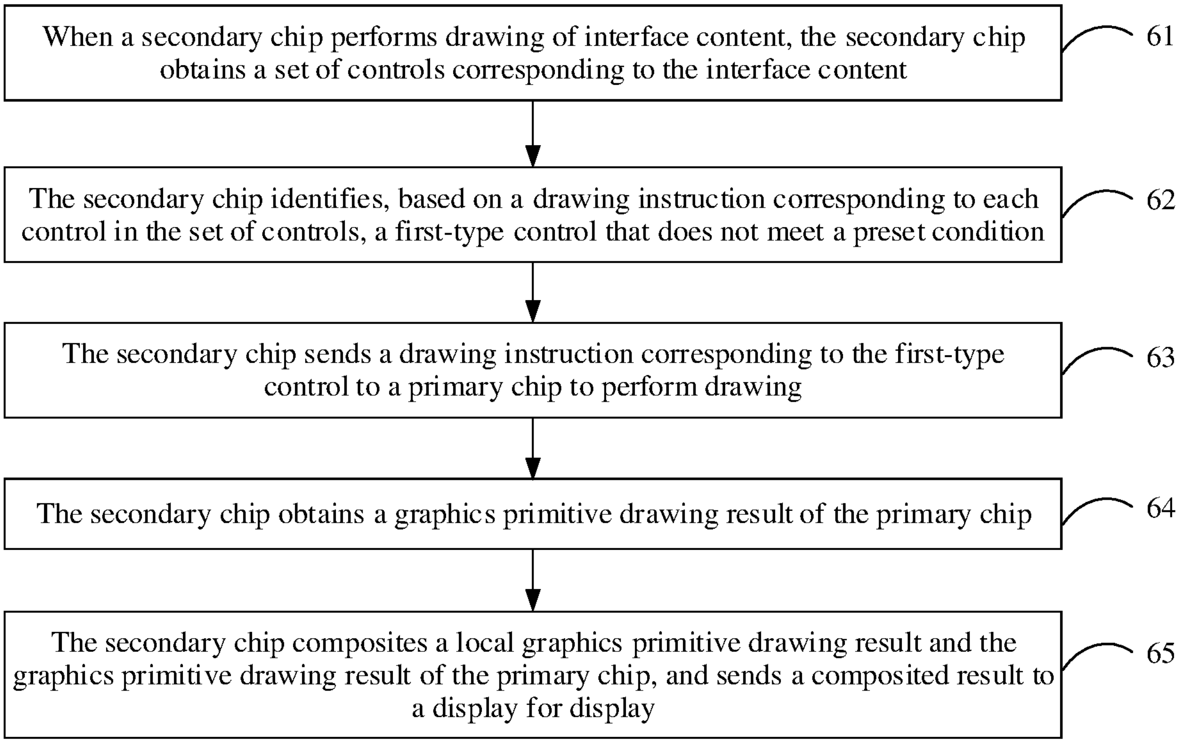
FIG. 6 is a schematic flowchart of a graphics primitive sharing method according to an embodiment of this application.

Refer to FIG. 6. An embodiment of this application provides a graphics primitive sharing method, applied to an electronic device 100. The electronic device 100 includes a display 10, a primary chip 12, and a secondary chip 14. The primary chip 12 is configured to run a first operating system, and the secondary chip 14 is configured to run a second operating system. In this embodiment, the graphics primitive sharing method may include the following steps:

61: When the secondary chip 14 performs drawing of interface content, the secondary chip 14 obtains a set of controls corresponding to the interface content.

In some embodiments, the set of controls may include at least one control. The second operating system may include a UI drawing framework, and the UI drawing framework may generate, based on the interface content, the set of controls needed for drawing the interface content. That is, the secondary chip 14 may obtain, by using the UI drawing framework, the set of controls corresponding to the interface content.

62: The secondary chip 14 identifies, based on a drawing instruction corresponding to each control in the set of controls, a first-type control that does not meet a preset condition.

In some embodiments, the preset condition may be defined based on an actual requirement. For example, the preset condition may mean that a graphics primitive obtained by drawing on a secondary chip side has disadvantages such as jaggies and definition that does not meet a requirement. The UI drawing framework may identify the drawing instruction corresponding to each control in the set of controls. When a drawing instruction corresponding to a control includes a preset instruction, it may be determined that a drawing effect of a graphics primitive corresponding to the control is poor when drawing of the graphics primitive is performed on the secondary chip side, and the primary chip 12 needs to assist in drawing. The control is determined as the first-type control. The preset instruction may be pre-defined based on graphics primitive drawing performance of the secondary chip 14. For example, when the secondary chip 14 draws an arc text, jaggies are generated, and the preset instruction may be set to a drawing instruction including the arc text. When the UI drawing framework identifies that a drawing instruction of a control includes a drawing instruction of the arc text, the control is determined as the first-type control that does not meet the preset condition.

In some embodiments, the secondary chip 14 may further mark a control that does not meet the preset condition, and the marked control is the first-type control, so that a drawing instruction corresponding to the first-type control is subsequently sent to the primary chip 12.

63: The secondary chip 14 sends the drawing instruction corresponding to the first-type control to the primary chip 12 to perform drawing.

In some embodiments, the primary chip 12 may be a processing chip with high power consumption and high chip computing power, such as a CPU, a SoC, or an AP. The secondary chip 14 may be a processing chip with low power consumption and low chip computing power, such as an MCU or an SCM. Because chip performance of the primary chip 12 is higher than chip performance of the secondary chip 14, the secondary chip 14 sends the drawing instruction corresponding to the first-type control to the primary chip 12 to perform drawing, so that a disadvantage such as jaggies can be avoided.

64: The secondary chip 14 obtains a graphics primitive drawing result of the primary chip 12.

In some embodiments, the electronic device 100 may further include a first graphics memory 16, and both the primary chip 12 and the secondary chip 14 have read permission of the first graphics memory 16. The primary chip 12 may store the graphics primitive drawing result in the first graphics memory 16, and the secondary chip 14 reads the graphics primitive drawing result of the primary chip 12 from the first graphics memory 16. In another embodiment, the primary chip 12 may alternatively send the graphics primitive drawing result to the secondary chip 14.

65: The secondary chip 14 composites a local graphics primitive drawing result and the graphics primitive drawing result of the primary chip 12, and sends a composited result to the display 10 for display.

In some embodiments, the local graphics primitive drawing result may be a graphics primitive obtained by the secondary chip 14 executing the drawing instruction corresponding to each control in the set of controls to perform drawing.

In some embodiments, the local graphics primitive drawing result of the secondary chip 14 may constitute complete interface content, but jaggies exist in the interface content obtained through compositing. The secondary chip 14 may composite the local graphics primitive drawing result and the graphics primitive drawing result of the primary chip 12 in a superimposed manner, so that jaggies do not exist in interface content finally obtained through compositing.

In some embodiments, the secondary chip 14 may alternatively replace a graphics primitive in which jaggies exist in the local graphics primitive drawing result with the graphics primitive drawing result of the primary chip 12, so that jaggies do not exist in interface content finally obtained through compositing.

According to the foregoing graphics primitive sharing method, when the secondary chip performs drawing of the interface content, for a control whose drawing effect is poor, the secondary chip may request the primary chip to assist in drawing, to supplement a disadvantage that the secondary chip cannot perform drawing of a complex and fine interface due to a low hardware capability.

Figure 7:
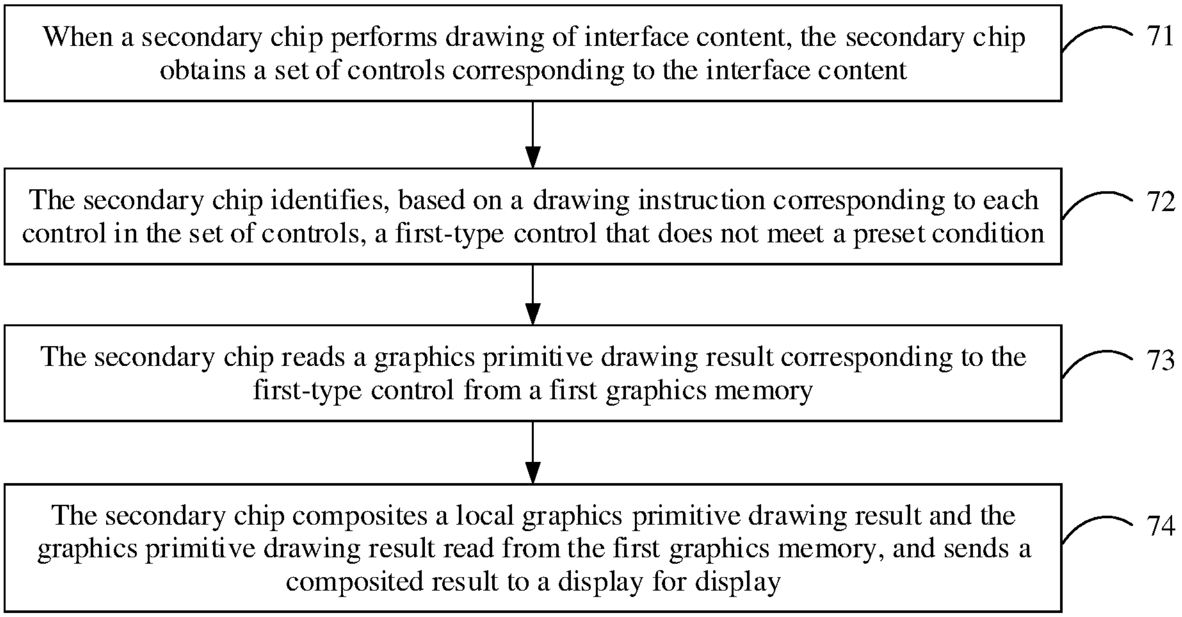
FIG. 7 is a schematic flowchart of a graphics primitive sharing method according to another embodiment of this application.

Refer to FIG. 7. An embodiment of this application provides a graphics primitive sharing method, applied to an electronic device 100. The electronic device 100 includes a display 10, a primary chip 12, a secondary chip 14, and a first graphics memory 16. The primary chip 12 is configured to run a first operating system, and the secondary chip 14 is configured to run a second operating system. In this embodiment, the graphics primitive sharing method may include the following steps:

71: When the secondary chip 14 performs drawing of interface content, the secondary chip 14 obtains a set of controls corresponding to the interface content.

In some embodiments, the set of controls may include at least one control. The second operating system may include a UI drawing framework, and the UI drawing framework may generate, based on the interface content, the set of controls needed for drawing the interface content. That is, the secondary chip 14 may obtain, by using the UI drawing framework, the set of controls corresponding to the interface content.

72: The secondary chip 14 identifies, based on a drawing instruction corresponding to each control in the set of controls, a first-type control that does not meet a preset condition.

In some embodiments, the preset condition may be defined based on an actual requirement. For example, the preset condition may mean that a graphics primitive obtained by drawing on a secondary chip side has disadvantages such as jaggies and definition that does not meet a requirement. When a drawing instruction corresponding to a control includes a preset instruction, it may be determined that the control is the first-type control. The preset instruction may be pre-defined based on graphics primitive drawing performance of the secondary chip 14. For example, when the secondary chip 14 draws an arc text, jaggies are generated, and the preset instruction may be set to a drawing instruction including the arc text.

73: The secondary chip 14 reads a graphics primitive drawing result corresponding to the first-type control from the first graphics memory 16.

In some embodiments, the first graphics memory 16 may be any one of an SRAM, an SDRAM, a DDR, or the like. The first graphics memory 16 may alternatively select another type of memory based on an actual application scenario. After the electronic device 100 is powered on, the primary chip 12 may identify a control whose drawing effect is poor on a secondary chip side. The controls whose drawing effect is poor may be marked by the primary chip 12. The primary chip 12 may perform pre-drawing of the marked controls, and a drawing result is stored in the first graphics memory 16. In this way, the secondary chip 14 may attempt to read, from the first graphics memory 16, the graphics primitive drawing result corresponding to the first-type control.

In some embodiments, for a preset application installed in the second operating system, the primary chip 12 may pre-identify a control whose drawing effect is poor on the secondary chip side and that is in an interface of the preset application. The controls whose drawing effect is poor may be marked by the primary chip 12. The primary chip 12 may pre-render the marked controls into shared graphics primitives and store the shared graphics primitives in the first graphics memory 16. When performing interface content drawing, the secondary chip 14 may attempt to replace a graphics primitive whose drawing effect is poor with the shared graphics primitive stored in the first graphics memory 16. If a shared graphics primitive needed by the secondary chip 14 is not included in the first graphics memory 16, the secondary chip 14 may further delegate the primary chip 12 to perform graphics primitive drawing, and subsequently the secondary chip 14 reads, from the first graphics memory 16, the graphics primitive drawing result corresponding to the first-type control.

74: The secondary chip 14 composites a local graphics primitive drawing result and the graphics primitive drawing result read from the first graphics memory 16, and sends a composited result to the display 10 for display.

In some embodiments, the local graphics primitive drawing result may be a graphics primitive obtained by the secondary chip 14 executing the drawing instruction corresponding to each control in the set of controls to perform drawing. A local graphics primitive drawing result of the secondary chip 14 may constitute complete interface content, but jaggies exist in the interface content obtained through compositing. The secondary chip 14 may composite the local graphics primitive drawing result and the graphics primitive drawing result read from the first graphics memory 16 in a superimposed manner, so that jaggies do not exist in interface content finally obtained through compositing.

In some embodiments, the secondary chip 14 may alternatively replace a graphics primitive in which jaggies exist in the local graphics primitive drawing result with the graphics primitive drawing result read from the first graphics memory 16, so that jaggies do not exist in interface content finally obtained through compositing.

In the foregoing graphics primitive sharing method, when the secondary chip performs drawing of the interface content, for the control whose drawing effect is poor, the secondary chip may attempt to read, from the first graphics memory, a graphics primitive pre-drawn by the primary chip. If a graphics primitive needed by the secondary chip is not included in the first graphics memory 16, the secondary chip may request the primary chip to assist in drawing, to supplement a disadvantage that the secondary chip cannot perform drawing of a complex and fine interface due to a low hardware capability.

Figure 8:
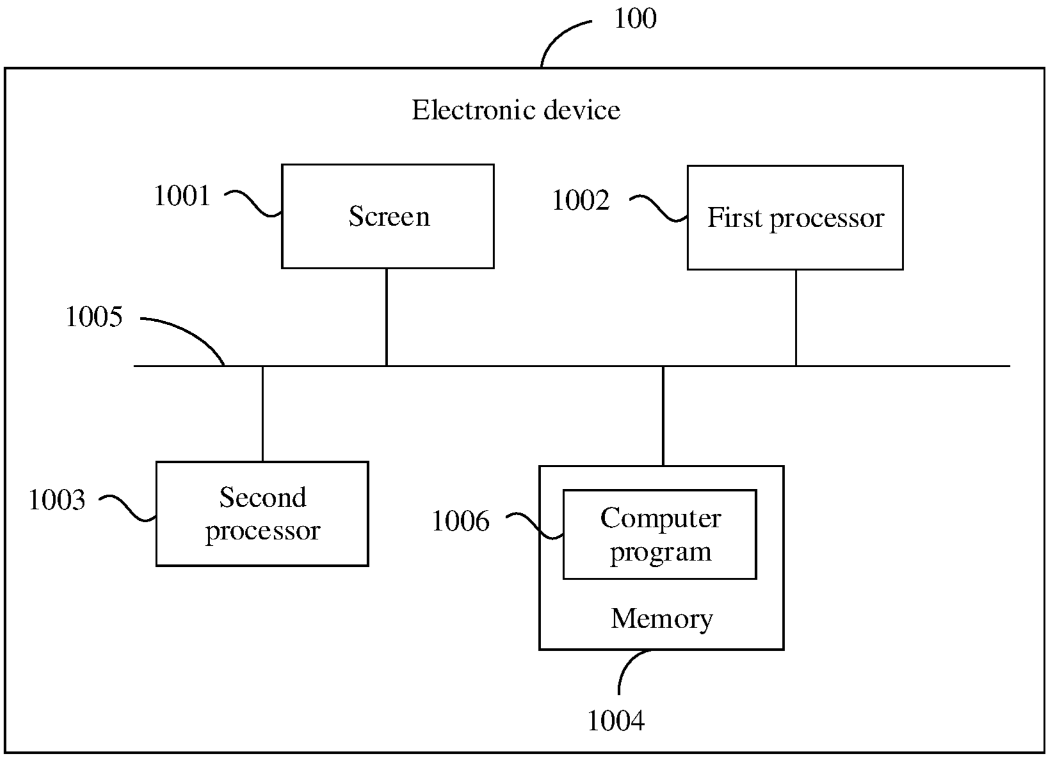
FIG. 8 is a schematic diagram of a possible structure of an electronic device according to an embodiment of this application.

FIG. 8 is a schematic diagram of a hardware structure of an electronic device 100 according to an embodiment of this application. As shown in FIG. 8, the electronic device 100 may include a screen 1001, a first processor 1002, a second processor 1003, a memory 1004, and a communication bus 1005. The memory 1004 is configured to store one or more computer programs 1006. The one or more computer programs 1006 are configured to be executed by the second processor 1003. The one or more computer programs 1006 include instructions, and the second processor 1003 executes the instructions to perform the foregoing graphics primitive sharing method in the electronic device 100.

It may be understood that the structure shown in this embodiment does not constitute a specific limitation on the electronic device 100. In some other embodiments, the electronic device 100 may include more or fewer components than components shown in the figure, or some components may be combined, or some components may be split, or different component arrangements may be used.

Both the first processor 1002 and the second processor 1003 may include one or more processing units. For example, both the first processor 1002 and the second processor 1003 may include a modem, a graphics processing unit (graphics processing unit, GPU), an image signal processor (image signal processor, ISP), a controller, a video codec, a digital signal processor (digital signal processor, DSP), a baseband processor, and/or a neural-network processor (neural-network processing unit, NPU). Different processing units may be independent components, or may be integrated into one or more processors.

The first processor 1002 and the second processor 1003 may be further provided with a memory, configured to store instructions and data. In some embodiments, the memory in the first processor 1002 and the memory in the second processor 1003 are caches. The memory may store instructions or data that is just used or cyclically used by the first processor 1002 or the second processor 1003. If the first processor 1002 and the second processor 1003 need to use the instructions or the data again, the instructions or the data may be directly invoked from the memory. Repeated access is avoided, and waiting time of the first processor 1002 and the second processor 1003 is reduced, improving system efficiency.

In some embodiments, both the first processor 1002 and the second processor 1003 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

In some embodiments, the memory 1004 may include a high-speed random access memory, and may further include a non-volatile memory, for example, a hard disk drive, a memory, a plug-connected hard disk drive, a smart media card (Smart Media Card, SMC), a secure digital (Secure Digital, SD) card, a flash card (Flash Card), at least one magnetic disk storage device, a flash memory device, or another non-volatile solid-state storage device.

Embodiments of this application further provide a computer storage medium. The computer storage medium stores computer instructions. When the computer instructions are run on an electronic device, the electronic device is enabled to perform the related method steps, to implement the graphics primitive sharing method in the foregoing embodiments.

This embodiment further provides a computer program product. When the computer program product is run on a computer, the computer is enabled to perform the foregoing related steps, to implement the graphics primitive sharing method in the foregoing embodiments.

In addition, an embodiment of this application further provides an apparatus. The apparatus may be specifically a chip, a component, or a module, and the apparatus may include a processor and a memory that are connected. The memory is configured to store computer-executable instructions. When the apparatus runs, the processor may execute the computer-executable instructions stored in the memory, to enable a chip to perform the graphics primitive sharing method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein.

The foregoing descriptions of implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the apparatus embodiments described above are merely examples. For example, division into the modules or units is merely logical function division, and may be other division in an actual implementation. For example, a plurality of units or assemblies may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. A part displayed as a unit may be one or more physical units, that is, may be located in one place, or may be distributed in a plurality of different places. Some or all of the units may be selected depending on actual requirements to achieve the objectives of the solutions in the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk drive, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A method, applied to an electronic device, wherein the electronic device comprises a primary chip, a secondary chip, and a display, the primary chip is configured to run a first operating system, the secondary chip is configured to run a second operating system, and the method comprises:

when the secondary chip performs drawing of interface content, obtaining, by the secondary chip, a set of controls corresponding to the interface content, wherein the set of controls comprise at least one control;

identifying, by the secondary chip based on a corresponding drawing instruction for each control in the set of controls, a first-type control, wherein a quality of a graphics primitive corresponding to the first-type control does not meet a preset condition when the graphics primitive of the first-type control is drawn by the secondary chip;

sending, by the secondary chip, a first drawing instruction corresponding to the first-type control to the primary chip, wherein the first drawing instruction requests the primary chip to perform drawing of the graphics primitive of the first-type control;

obtaining, by the secondary chip, a graphics primitive drawing result of the primary chip corresponding to the first-type control requested in the first drawing instruction; and compositing, by the secondary chip, a local graphics primitive drawing result and the graphics primitive drawing result of the primary chip to obtain a composited result, and sending the composited result to the display, wherein the local graphics primitive drawing result is obtained by the secondary chip executing the corresponding drawing instruction for each control in the set of controls to perform drawing, wherein compositing, by the secondary chip, the local graphics primitive drawing result and the graphics primitive drawing result of the primary chip comprises:

compositing, by the secondary chip, the graphics primitive drawing result of the primary chip and the local graphics primitive drawing result in a superimposed manner; or replacing, by the secondary chip, a part that is in the local graphics primitive drawing result and that is corresponding to the first-type control with the graphics primitive drawing result of the primary chip.

2. The method according to claim 1, further comprising: invoking, by the secondary chip, a user interface (UI) drawing framework to obtain the corresponding drawing instruction for each control in the set of controls.

3. The method according to claim 1, wherein sending, by the secondary chip, the first drawing instruction corresponding to the first-type control to the primary chip to perform drawing comprises:

marking, by the secondary chip, a control that does not meet the preset condition as the first-type control; and sending, by the secondary chip, the first drawing instruction corresponding to the first-type control to the primary chip to perform drawing.

4. The method according to claim 3, wherein the electronic device further comprises a memory, the memory is configured to store the graphics primitive drawing result of the primary chip, and obtaining, by the secondary chip, the graphics primitive drawing result of the primary chip comprises:

reading, by the secondary chip, the graphics primitive drawing result of the primary chip from the memory.

5. The method according to claim 1, wherein identifying, by the secondary chip based on the corresponding drawing instruction for each control in the set of controls, the first-type control that does not meet the preset condition comprises:

when a first drawing instruction corresponding to a first control of the set of controls comprises a preset instruction, determining, by the secondary chip, that the first control is the first-type control.

6. The method according to claim 1, wherein:

the first operating system comprises a first graphics primitive sharing service program and a graphics primitive drawing program, and the second operating system comprises a second graphics primitive sharing service program and a first application;

when the first application performs drawing of interface content, the first application obtains a shared graphics primitive comprised in the interface content, wherein the shared graphics primitive is a graphics primitive whose drawing effect on the secondary chip side does not meet a preset requirement;

the first application sends a drawing request of the shared graphics primitive to the graphics primitive drawing program through the second graphics primitive sharing service program and the first graphics primitive sharing service program;

the graphics primitive drawing program performs graphics primitive drawing in response to the drawing request of the shared graphics primitive to obtain the graphics primitive drawing result; and the primary chip stores the graphics primitive drawing result from the graphics primitive drawing program in the memory.

7. A method, applied to an electronic device, wherein the electronic device comprises a primary chip, a secondary chip, a memory, and a display, the primary chip is configured to run a first operating system, the secondary chip is configured to run a second operating system, the second operating system comprises at least one preset application, and the method comprises:

when the secondary chip performs drawing of interface content, obtaining, by the secondary chip, a first set of controls corresponding to the interface content, wherein the first set of controls comprise at least one control;

identifying, by the secondary chip based on a corresponding drawing instruction for each control in the first set of controls, a first-type control that does not meet a preset condition;

reading, by the secondary chip, a graphics primitive drawing result corresponding to the first-type control from the memory;

compositing, by the secondary chip, a local graphics primitive drawing result and the graphics primitive drawing result read from the memory to obtain a composited result, and sending the composited result to the display, wherein the local graphics primitive drawing result is obtained by the secondary chip executing the corresponding drawing instruction for each control of the first set of controls to perform drawing;

obtaining, by the primary chip, a second set of controls corresponding to drawing interface content of the preset application;

identifying, by the primary chip, a first control that is in the second set of controls and that does not meet the preset condition;

executing, by the primary chip, a first drawing instruction corresponding to the first control that is in the second set of controls and that does not meet the preset condition, to obtain a plurality of shared graphics primitives through drawing; and storing, by the primary chip, the plurality of shared graphics primitives in the memory.

8. The method according to claim 7, further comprising:

when the secondary chip fails to read, from the memory, the graphics primitive drawing result corresponding to the first-type control, sending, by the secondary chip, a second drawing instruction corresponding to a control that is in the first-type control and that does not have a graphics primitive drawing result to the primary chip to perform drawing; and executing, by the primary chip, the second drawing instruction sent by the secondary chip, and storing the graphics primitive drawing result corresponding to the first-type control and the second drawing instruction in the memory.

9. The method according to claim 7, wherein identifying, by the secondary chip based on the drawing instruction corresponding to each control in the first set of controls, the first-type control that does not meet the preset condition comprises:

when the corresponding drawing instruction of a first control of the first set of controls comprises a preset instruction, determining, by the secondary chip, that the first control is the first-type control.

10. The method according to claim 7, wherein compositing, by the secondary chip, the local graphics primitive drawing result and the graphics primitive drawing result read from the memory comprises:

compositing, by the secondary chip, the graphics primitive drawing result read from the memory and the local graphics primitive drawing result in a superimposed manner; or replacing, by the secondary chip, a part that is in the local graphics primitive drawing result and that is corresponding to the first-type control with the graphics primitive drawing result read from the memory.

11. An electronic device, comprising:

a primary chip configured to run a first operating system;

a secondary chip configured to run a second operating system;

a memory; and a display, wherein the secondary chip is further configured to:

obtain a set of controls corresponding to interface content when performing drawing of the interface content;

identify, based on a corresponding drawing instruction for each control in the set of controls, a first-type control that, wherein a quality of a graphics primitive corresponding to the first-type control does not meet a preset condition when the graphics primitive of the first-type control is drawn by the secondary chip;

send a first drawing instruction corresponding to the first-type control to the primary chip, wherein the first drawing instruction requests the primary chip to perform drawing of the graphics primitive of the first-type control;

obtain a graphics primitive drawing result of the primary chip corresponding to the first-type control requested in the first drawing instruction;

composite a local graphics primitive drawing result and the graphics primitive drawing result of the primary chip to obtain a composited result, wherein the secondary chip is configured to composite the local graphics primitive drawing result and the graphics primitive drawing result of the primary chip to obtain the composited result by:

compositing the graphics primitive drawing result of the primary chip and the local graphics primitive drawing result in a superimposed manner; or replacing a part that is in the local graphics primitive drawing result and that is corresponding to the first-type control with the graphics primitive drawing result of the primary chip; and send the composited result to the display, wherein the local graphics primitive drawing result is obtained by the secondary chip executing the corresponding drawing instruction for each control of the set of controls to perform drawing.

12. The electronic device according to claim 11, the secondary chip is further configured to:

invoke a UI drawing framework to obtain the corresponding drawing instruction for each control in the set of controls.

13. The electronic device according to claim 11, the secondary chip is further configured to:

mark a first control of the set of controls that does not meet the preset condition to obtain the first-type control; and send the first drawing instruction corresponding to the first-type control to the primary chip to perform drawing.

14. The electronic device according to claim 13, wherein the memory is configured to store the graphics primitive drawing result of the primary chip, and the secondary chip is further configured to:

read the graphics primitive drawing result of the primary chip from the memory.

15. The electronic device according to claim 11, wherein the secondary chip is further configured to:

determine that a first control of the set of controls is the first-type control when a drawing instruction corresponding to the first control comprises a preset instruction.

16. The electronic device according to claim 11, wherein:

the first operating system comprises a first graphics primitive sharing service program and a graphics primitive drawing program, and the second operating system comprises a second graphics primitive sharing service program and a first application;

when the first application performs drawing of interface content, the first application obtains a shared graphics primitive comprised in the interface content, wherein the shared graphics primitive is a graphics primitive whose drawing effect on the secondary chip side does not meet a preset requirement;

the first application sends a drawing request of the shared graphics primitive to the graphics primitive drawing program through the second graphics primitive sharing service program and the first graphics primitive sharing service program;

the graphics primitive drawing program performs graphics primitive drawing in response to the drawing request of the shared graphics primitive to obtain the graphics primitive drawing result; and the primary chip stores the graphics primitive drawing result from the graphics primitive drawing program in the memory.

17. The electronic device according to claim 16, wherein the secondary chip is configured to composite the local graphics primitive drawing result and the graphics primitive drawing result of the primary chip to obtain the composited result by:

compositing the graphics primitive drawing result of the primary chip and the local graphics primitive drawing result in a superimposed manner; or replacing a part that is in the local graphics primitive drawing result and that is corresponding to the first-type control with the graphics primitive drawing result of the primary chip.

* * * * *